Dec. 30, 1969   M. WIDELL   3,486,943
METHOD OF OPERATING A HIGH TEMPERATURE FUEL CELL
Filed March 16, 1967

INVENTOR.
MARJA WIDELL
BY
Bailey, Stephens & Huettig
ATTORNEYS

United States Patent Office 3,486,943
Patented Dec. 30, 1969

3,486,943
METHOD OF OPERATING A HIGH TEMPERATURE FUEL CELL
Marja Widell, Vasteras, Sweden, assignor to Allmänna Svenska Elektriska Aktienbolaget, Vasteras, Sweden, a Swedish corporation
Filed Mar. 16, 1967, Ser. No. 623,756
Claims priority, application Sweden, Mar. 25, 1966, 3,943/66
Int. Cl. H01m 27/22, 27/00
U.S. Cl. 136—86        4 Claims

ABSTRACT OF THE DISCLOSURE

A high-temperature fuel cell is placed and heated in a region of a gas flame which contains gas which has not undergone combustion and which thus surrounds the fuel cell and acts as a fuel. An oxidant is supplied to an inner space in the fuel cell.

BACKGROUND OF THE INVENTION

Field of the invention

The present invention relates to a method of operating a high temperature fuel cell comprising a heat resistant solid body constituting or containing an electrolyte for the fuel cell.

Description of the prior art

Such fuel cells are often provided with an inner space for an oxidant within the solid body, an oxidant electrode in contact with the electrolyte in the inner space and a fuel electrode in contact with the electrolyte outside the body. The fuel cells are operated by placing the solid body in a chamber containing a gas which thus surrounds the solid body and which is capable of acting as a fuel for the fuel cell, and by supplying an oxidant to the inner space of the solid body. The chamber containing the fuel is then heated from the outside.

In these known fuel cells it is difficult to establish an effective sealing of the chamber containing the fuel gas and the inner space containing the oxidant and to establish reliable connections between the fuel cell and conduits for supplying fuel and oxidant to the fuel cell. All these problems are effectively eliminated according to the present invention.

SUMMARY OF THE INVENTION

The present invention relates more particularly to a method of operating a high temperature fuel cell comprising a heat resistant solid body comprising an electrolyte for the fuel cell, for example consisting of a body of calcia stabilized zirconium dioxide or of a porous body of sintered magnesium oxide containing alkali carbonate in the pores, the solid body having an inner space for an oxidant, an oxidant electrode in contact with the electrolyte in the inner space and a fuel electrode in contact with the electrolyte on the outside of the body which is surrounded by a gaseous fuel, characterised in that the solid body is placed and heated in a region of a gas flame, which contains combustible gas which has not undergone combustion and which thus surrounds the solid body and acts as fuel for the fuel cell.

According to an advantageous embodiment of the invention the solid body is made substantially tube shaped so that the hollow part of the tube forms the inner space.

If the solid body of the fuel cell consists of the electrolyte it may, besides calcia stabilized zirconium dioxide which consists of about 85 mole percent $ZrO_2$ and about 15 mole percent $CaO$, also consist inter alia, of other oxygen ion conducting oxides such as yttria stabilized thorium oxide which consists of approximately 92.5 mole percent $ThO_2$ and approximately 7.5 mole percent $Y_2O_3$ or of yttria stabilized zirconium dioxide, which consists of approximately 92 mole percent $ZrO_2$ and 8 mole percent $Y_2O_3$.

If the solid body consists of a porous carrier for the electrolyte it may, besides sintered magnesium oxide, also consist, inter alia, of sintered aluminium oxide. The electrolyte in the pores may consist of an alkali carbonate or a mixture of alkali carbonates such as an eutectic mixture of potassium, sodium and lithium carbonate.

Suitable electrode material on the oxidant side is, inter alia, platinum and palladium and on the fuel side, inter alia, nickel and platinum. In the case the electrolyte consists of a carbonate the electrode on the oxidant side may also advantageously consist of silver.

As examples of possible fuels for the fuel cell and as combustible material in the gas flame may be mentioned coal gas, natural gas, hydrogen gas, mixtures of the low molecular hydrocarbons, for example liquefied petroleum gas as well as kerosene and other volatile hydrocarbons. The oxidant may, inter alia, consist of oxygen or air. When air is used as oxidant it can be taken from the surroundings and by natural draught be drawn into the oxidant space of the fuel cell.

BRIEF DESCRIPTION OF THE DRAWINGS

The invention will be further explained by describing an embodiment with reference to the accompanying drawing in which.

DESCRIPTION OF THE PREFERRED EMBODIMENT

The gas burner 1 is supplied in the normal way with coal gas at 2 and air at 3. The gas undergoes combustion in the flame 4 which has an inner zone 5 with a high percentage of unconsumed gas. The inner parts of the outer zone 6 also contain gas, which has not undergone combustion.

Figure 1:
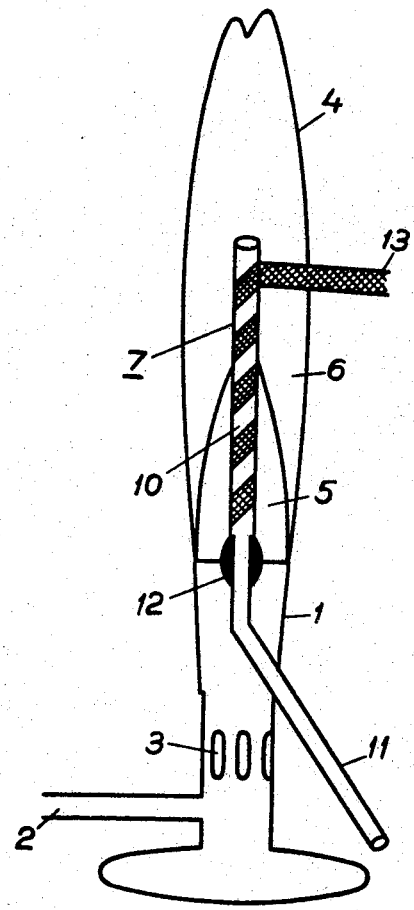
FIGURE 1 shows schematically a means for carrying out the method according to the invention and FIGURE 2 a cross section of the fuel cell in FIGURE 1.
Figure 2:
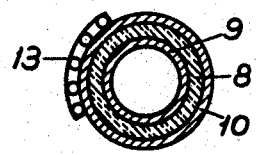

The electrolyte 8 (FIGURE 2) of the fuel cell 7 consists of calcia stabilized zirconium dioxide. The electrolyte constitutes also the solid body and is tube-shaped. On the inside of the tube is the oxidant electrode 9 consisting of a platinum layer and on its outside is arranged the fuel electrode 10 consisting of a nickel layer. Both electrodes are of course pervious to gas. The inner electrode 9 is electrically connected to the metal tube 11 for air supply by natural draught. The connection 12 between the parts 8 and 11 consists of nickel aluminide. The tube 11 also acts as a terminal for current. Outside the outer electrode 10 a second terminal 13 for current is arranged consisting of a strip of nickel net in contact with the electrode 10.

I claim:
1. Method of operating a high temperature fuel cell comprising a heat resistant solid body comprising an electrolyte for the fuel cell, the solid body having an inner space for an oxidant, an oxidant electrode in contact with the electrolyte in the inner space and a fuel electrode in contact with the electrolyte on the outside of the body, the steps comprising placing and heating the solid body in a region of a gas flame which contains combustible gas, which has not undergone combustion and which thus surrounds the solid body and acts as fuel for the fuel cell, and supplying an oxidant to the inner space.

2. Method as claimed in claim 1, in which the solid body is made substantially tube-shaped, the hollow part of the tube forming the inner space.

3. Method as claimed in claim 2, in which the inner space is connected to a conduit at a substantial distance from the gas flame in free communication with air surrounding the gas flame, so that the air flows by natural draught through the inner space and acts as oxidant for the fuel cell.

4. Method as claimed in claim 1, in which the inner space is connected to a conduit at a substantial distance from the gas flame in free communication with air surrounding the gas flame, so that the air flows by natural draught through the inner space and acts as oxidant for the fuel cell.

References Cited

UNITED STATES PATENTS

| | | | |
|---|---|---|---|
| 3,138,487 | 6/1964 | Tragert | 136—86 X |
| 3,377,203 | 4/1968 | Mobius et al. | 136—86 |

WINSTON A. DOUGLAS, Primary Examiner

M. J. ANDREWS, Assistant Examiner